May 26, 1953 W. RINKER 2,639,509
DEVICE FOR MEASURING WORKPIECES SUCH
AS SCREW THREADS AND THE LIKE
Filed June 2, 1950 2 Sheets-Sheet 1

INVENTOR.
Wilhelm Rinker
BY Fred A. Klein
Attorney.

May 26, 1953

W. RINKER 2,639,509

DEVICE FOR MEASURING WORKPIECES SUCH
AS SCREW THREADS AND THE LIKE

Filed June 2, 1950

INVENTOR.
Wilhelm Rinker
BY Fred A. Klein
attorney

Patented May 26, 1953

2,639,509

UNITED STATES PATENT OFFICE 2,639,509

DEVICE FOR MEASURING WORKPIECES SUCH AS SCREW THREADS AND THE LIKE

Wilhelm Rinker, Wetzlar, Germany, assignor to Ernst Leitz, G. m. b. H., Wetzlar, Germany, a corporation of Germany Application June 2, 1950, Serial No. 165,678
In Germany August 13, 1949

6 Claims. (Cl. 33—143)

The present invention relates to improvements in apparatus for measuring work pieces between measuring areas, and more particularly for measuring screw threads, etc., the device being adapted to operate in accordance with the so-called wire method of measuring, i. e., a method in which use is made of measuring wires for measuring the threads.

This method allows the use of an ordinary micrometer, and measurement is accomplished by placing three wires, all of the same size into the groove of the thread. The size of the wires should be such that they will bear on the side walls of the thread at the pitch diameter when the thread is finished. Knowing the outside diameter of the screw, the wire sizes, and pitch of the thread, the measurement over the wires can then be computed by means of certain well-known formulae.

As practiced heretofore, this method suffers from the drawback that the weight of the screw which is being measured is apt to deform the measuring wires, particularly those of small diameter. Furthermore, the pressure exerted upon the lower measuring wire is greater than that exerted upon the upper wire due to the weight of the piece being measured, and this inequality detrimentally affects the accuracy of the operation. Last, but not least, it is very difficult to manually adjust the point of "culmination" of the piece to be measured with reference to the measuring means.

It is a general object of the present invention to provide an apparatus of the character set forth, in which the measuring wires are not deformed during measurements, particularly when measuring threads of small pitch, and wherein no detrimental effect occurs by the unequal distribution of the weights on the upper and lower wires.

It is a further object of the present invention to provide means for exact measurement by supplying adjusting means not entirely dependent on hand operation, particularly in the adjustment of the apparatus to the point of "culmination" of the part to be measured.

In accordance with the above objects, the present invention provides a gimbal joint for mounting the test part supporting means as well as an adjustable balancing weight. The gimbal ring to which the test part support means is attached is preferably provided with positioning means for the purpose of locating the measuring surfaces and the measuring axis (point of "culmination") in a desired position.

A preferred embodiment of the invention comprises a support arrangement for the test piece consisting of a yoke supported by gimbals comprising an exterior ring being provided with an arm having a sliding weight mounted on it, and an interior ring upon which the exterior ring is mounted and which is displaceable in the plane of both universal axes by means of an eccentric drive pin, as well as being pivotable about its own axis by means of a screw pin. The support arrangement is vertically adjustable and may be fastened to the pillar of the measuring stand by means of a sleeve movable along the pillar and carrying the gimbals. The rings are suitably provided with pointers for indicating their deviations from the position of equilibrium. The holding yoke itself is suitably provided with adjustable holding points (centers).

For a clearer understanding of the nature of this invention and the additional advantages, features and objects thereof, reference is made to the following description taken in connection with the accompanying drawings, in which like reference characters represent like or similar parts, and in which.

Figure 2:
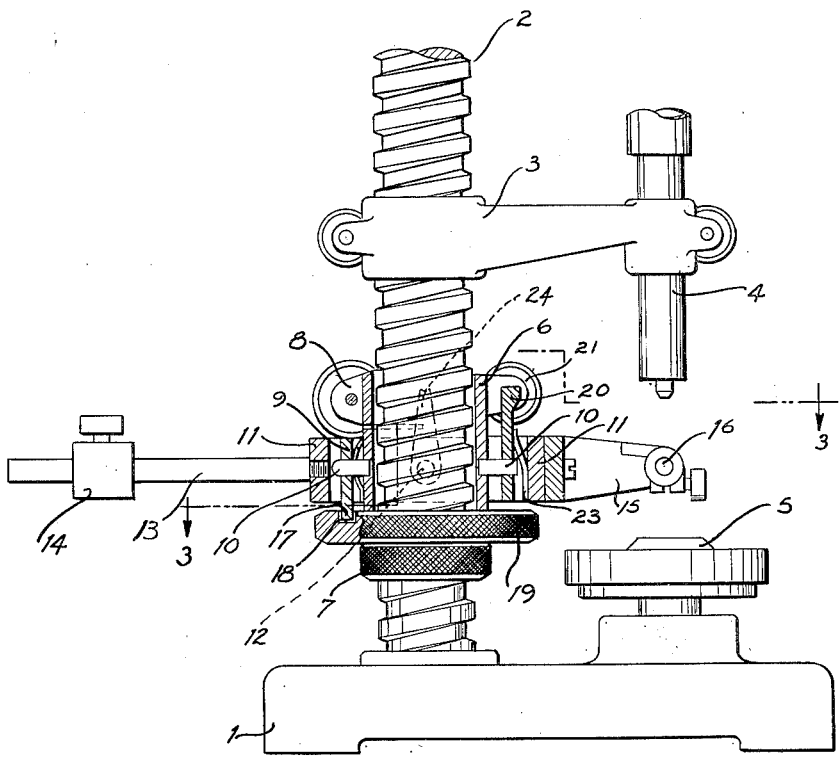
Figure 2 is an elevation of the measuring apparatus of this invention, with the holding arrangement, partly in section.
Figure 1:
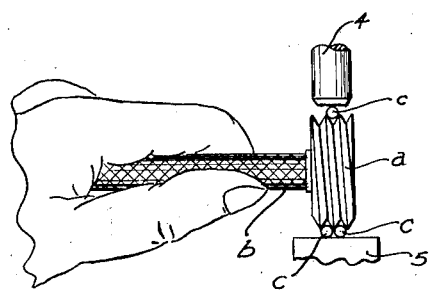
Figure 1 is an elevation showing the position of a test piece as measured by hand.
Figure 3:
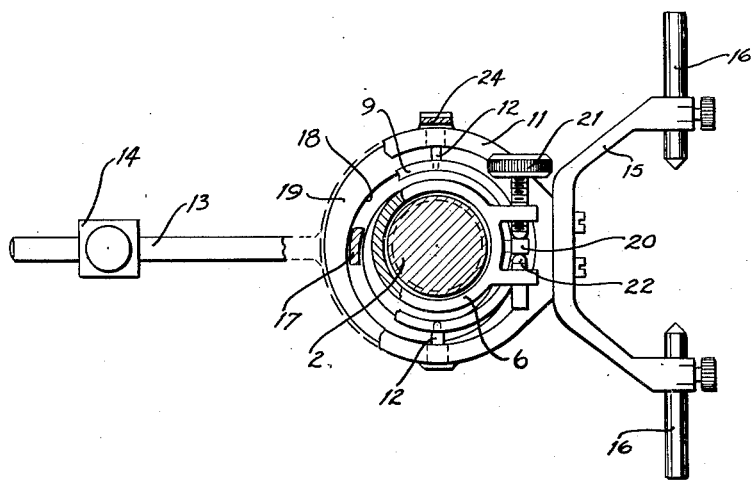
Figure 3 is a top view of the holding arrangement, partly in section.
Figure 4:
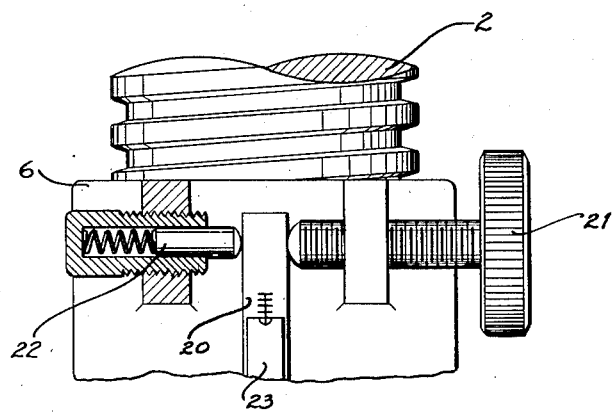
Figure 4 is an elevation, partly in section, showing the adjusting means for the universal rings on an enlarged scale.

As shown in the drawings, the apparatus consists of a stand having a support or bed plate 1 and a guide pillar 2 along which the upper measuring head 4 is guided by means of arm 3. Member 1 carries the adjustable lower measuring base 5. Heretofore (see Fig. 1) measurements were taken by holding test piece *a* with one hand by means of a handle *b*, the measuring wires *c* being interposed between the measuring members 4 and 5. The present invention provides means including the sleeve 6 mounted on pillar 2 between plate 1 and the adjustable arm 3. The sleeve 6 is adjustable along the pillar 2 by means of the knurled nut 7 and may be tightened to said pillar by means of clamp arrangement 8. Inner ring 9 is pivotable around axle 10 mounted on sleeve 6; the ring 9 supports outer ring 11 which is pivotable about axle 12. The ring 11 carries, on one side, balancing arm 13 with counterbalance weight 14 displaceable on said arm 13, and on the other side said ring 11 carries yoke 15 with its center points 16, which latter are adjustable in their axial directions, said center points being adapted to hold between them the piece a, b whose threads are to be measured. The inner ring 9 is provided with cam 17, which reaches into an eccentric groove 18 of disk 19, said disk being rotatably supported on sleeve 6 (Figs. 2 and 3). The ring 9 furthermore has associated with it a lever 20 which may be engaged or contacted by the adjusting screw 21 which latter is supported by sleeve 6. Opposite the adjusting screw and in axial direction, a spring-controlled compression member 22 is provided which also is fastened to sleeve 6 (Fig. 4). Ring 11 is provided with two pointers 23, 24, which are 90° apart at its circumference, said pointers indicating the deviations of the universal bearing from the center position.

The measuring apparatus operates substantially as follows:

For the purpose of measuring, the piece a, b is fastened between support points 16 of yoke 15, and the weight of the piece is balanced by corresponding adjustment of sliding weight 14 on the balancing arm 13. By rotating disk 19, the adjustment of the axis of the piece relative to the measuring axis between upper and lower measuring supports 4, 5 is accomplished by means of curved groove 18 and cam 17. The adjustment of axis support 16, a, b, 16 of the piece a, b may be accomplished by means of adjusting screw 21. The measuring wires c, interposed between piece a, b and the measuring support 4, 5 are now only subject to the measuring load produced by the upper measuring pin.

It will be understood that the apparatus described herein may be modified in numerous particulars without departing from the spirit and scope of this invention as defined in the following claims.

What is claimed is:

1. In combination with a device for measuring work pieces, such as screw threads and the like, by means of measuring wires positioned between a measuring base and a measuring head spaced from the base in a vertical direction: a gimbal joint mounted between the measuring base and the measuring head and axially offset therefrom, said gimbal joint consisting of a normally horizontal interior ring and a normally horizontal exterior ring mounted on the interior ring, support means for the work piece attached to said exterior ring and adapted to locate the work piece between the measuring base and the measuring head, an arm atached to the exterior ring substantially oppositely to the work piece support means, and a weight slidably mounted on said arm and adapted to counterbalance the weight of the work piece.

2. In the combination defined in claim 1, means for adjusting the position of the interior ring.

3. The combination as defined in claim 2, wherein said adjusting means comprises a cam means for shifting the interior ring towards and away from said measuring base and measuring head.

4. A device for measuring a work piece, such as a screw thread and the like, by means of measuring wires comprising, in combination, a horizontal support, a measuring base mounted on said support, a measuring head vertically adjustably mounted on said support and vertically aligned with said base, a vertical support mounted on the horizontal support adjacent the measuring base, a vertically adjustable sleeve mounted on said vertical support, a gimbal joint mounted on said sleeve between the measuring base and the measuring head, said gimbal joint consisting of a normally horizontal interior ring pivotally attached to the sleeve and a normally horizontal exterior ring mounted on the interior ring, support means for the work piece attached to said exterior ring and adapted to located the work piece between the measuring base and the measuring head, an arm attached to the exterior ring substantially oppositely to the work piece support means, and a weight slidably mounted on said arm and adapted to counterbalance the weight of the work piece.

5. A device as defined in claim 4, further comprising cam means for shifting the interior ring towards and away from said measuring base and measuring head, said cam means comprising a disc rotatably mounted on said sleeve and having a groove eccentric with respect to the center of the interior ring and a pin fixedly attached to said interior ring and extending into said groove.

6. A device as defined in claim 4, further comprising means for adjusting the horizontal position of the pivotally mounted interior ring.

WILHELM RINKER.

References Cited in the file of this patent

UNITED STATES PATENTS

| Number | Name | Date |
|---|---|---|
| 791,364 | Pfeiffer | May 30, 1905 |
| 2,105,961 | Andreini | Jan. 18, 1938 |
| 2,431,021 | Bourdelais | Nov. 18, 1947 |
| 2,497,199 | Aller | Feb. 14, 1950 |
| 2,563,910 | Bean | Aug. 14, 1951 |

FOREIGN PATENTS

| Number | Country | Date |
|---|---|---|
| 341,360 | Great Britain | Jan. 15, 1931 |